United States Patent [19]
Jones

[11] 3,951,918
[45] Apr. 20, 1976

[54] MANUFACTURE OF POLYSULPHONES
[75] Inventor: Michael Edward Benet Jones, Hitchin, England
[73] Assignee: Imperial Chemical Industries Limited, London, England
[22] Filed: July 8, 1974
[21] Appl. No.: 486,667

Related U.S. Application Data
[63] Continuation of Ser. No. 474,933, July 26, 1965, abandoned, which is a continuation-in-part of Ser. No. 320,508, Oct. 31, 1963.

[30] Foreign Application Priority Data
Nov. 6, 1962  United Kingdom........... 1059263/62
Mar. 18, 1963 United Kingdom........... 3201664/63
Aug. 6, 1964  United Kingdom............... 32016/64

[52] U.S. Cl............................... 260/49; 260/63 R; 260/79.3 M
[51] Int. Cl.² ................... C08G 75/20; C08G 75/23
[58] Field of Search................... 260/49, 79.3, 63 R

[56] References Cited
OTHER PUBLICATIONS
Fieser & Fieser, Organic Chemistry, Heath & Co., 1950, p. 578.

Primary Examiner—Lester L. Lee
Attorney, Agent, or Firm—Cushman, Darby & Cushman

[57] ABSTRACT

Process for preparing polyaryl sulphones in a diluent selected from the class consisting of nitrobenzenes of the formula

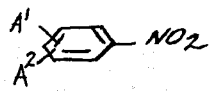

in which $A^1$ is selected from the class consisting of hydrogen, halogen atoms, alkyl groups, a cyano group and a nitro group and $A^2$ is selected from the class consisting of hydrogen, halogen atoms and alkyl groups, the alkyl groups having not more than 4 carbon atoms each.

10 Claims, No Drawings

MANUFACTURE OF POLYSULPHONES

This is a continuation of application Ser. No. 474,933, filed July 26, 1965, now abandoned, which is a continuation-in-part of Ser. No. 320,508, filed Oct. 31, 1963.

The present invention relates to the manufacture of polyaryl sulphones from aromatic sulphonyl halides.

Polyaryl sulphones containing repeating units of the formula —Ar—SO$_2$— may be manufactured by a process which comprises melting together a reagent of the formula H—Ar—SO$_2$.X and/or an equimolar mixture of reagents of the formulae X.SO$_2$—Ar—SO$_2$.X and H—Ar—H in the presence of from 0.05% to 5% by weight of the reagents of antimony pentachloride or of a salt of iron which is soluble in the polymerisation mixture. In these formulae X is a halogen (preferably chlorine) atom and Ar is a bivalent aromatic radical, preferably derived from benzene, a polynuclear hydrocarbon containing not more than two aromatic rings, or a compound of the Formula I

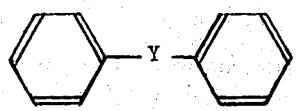
(I)

(in which Y is a direct line or is —O—, —S—, —SO—, —SO$_2$—, —CO—, a divalent hydrocarbon radical, or a residue of a diol, each benzene ring bearing one of the two valencies of the radical Ar) or ring-substituted derivatives thereof, and Ar may vary from unit to unit in the chain of the polymer produced.

The polyaryl sulphones are generally strong thermoplastic materials of high softening point. Those containing units of the Formula II have especially desirable properties:

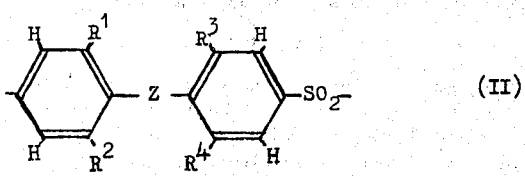
(II)

in this formula R$^1$, R$^2$, R$^3$ and R$^4$ are preferably hydrogen atoms but may also be halogen atoms or alkyl or alkoxy groups having from 1 to 4 carbon atoms, and Z is —O— or —S— and may also be a direct link in some of the units.

The manufacture of polyaryl sulphones by this process in the presence of diluents has hitherto been avoided because the presence of a diluent tended to slow down the reaction and lead to products of low molecular weight. Thus polymerisation in the presence of nitromethane and 1,1-dioxothiclan (cyclic tetramethylene sulphone) yielded products having reduced viscosities of only 0.041 and 0.07 respectively, even after six hours or more of reaction.

Polymerisation in the absence of diluents, however, has many disadvantages. For example, as polymerisation continues the mixture loses mobility and eventually becomes solid despite progressive increase in temperature, and in order to obtain products of high molecular weight it may be necessary to stop the reaction, grind the solid product into powder form and then continue the polymerisation in the solid phase. Such a two-stage process is cumbersome and uneconomic. Further, at the high temperatures required to obtain products of high molecular weight by this process there is danger of cross-linking when the reagents include disulphonyl halide. A further disadvantage is the loss of volatile reagents during the reaction at these high temperatures.

It has now been found, unexpectedly, that these polyaryl sulphones can be successfully manufactured at a temperature not exceeding 160°C in solution in a nitrobenzene of the Formula III;

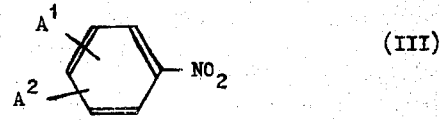
(III)

in this formula A$^1$ is a hydrogen or halogen atom or an alkyl, cyano or nitro group and A$^2$ is a hydrogen or halogen atom or an alkyl group, the alkyl groups having not more than 4 carbon atoms each. Nitrobenzene itself is preferred because it is readily available and is liquid at a suitable range of temperatures.

The reaction is effected at a temperature not greater than 160°C because the product of reactions effected at higher temperatures is generally discoloured to a significant extent. The preferred range of temperature is from 100°–140°C, at which the products suffer little or no discolouration. Although temperatures below 100°C (and even as low as 20°C) may be used, they result in prolonged reaction times.

The nitrobenzene diluent or solvent is preferably used in amounts of not more than 5 parts per part by weight of the polymerisable reagents. Using more diluent than this is not only uneconomic but generally leads to products of reduced molecular weight. On the other hand, with a very small amount of diluent the mixture tends to set to a solid mass during polymerisation, particularly when products of high molecular weight are being obtained. This causes difficulty in removing the material from the vessel and may even damage it. The preferred amounts of diluent are from 0.75 to 3 parts per part by weight of the polymerisable reagents. Equal weights of diluent and monomer have been found to give very good results.

The use of a diluent according to the invention enables the range of catalysts to be extended beyond antimony pentachloride and the salts of iron soluble in the polymerisable mixture. As well as antimony pentachloride and ferric chloride, and also ferric fluoride, ferrous bromide, ferrous iodide, ferric orthophosphate and ferrous and ferric acetoacetonates, other Lewis acids may be used which are capable of generating a sulphonylium cationic species -(Ar—SO$_2$) from an aromatic sulphonyl halaide -(Ar—SO$_2$.X) dissolved in a nitrobenzene of Formula III. Such Lewis acids may be found, for example, among the higher halides (especially fluorides and chlorides) of the elements of variable valency occurring in Groups Iv to VIII of the periodic table. Antimony pentachloride and ferric chloride are particularly effective, but molybdenum pentachloride and tungsten hexachloride are also good and titanium tetrafluoride, zirconium tetrachloride and antimony pentafluoride are among the other effective catalysts. The optimum amount of catalyst is generally equal to or somewhat above the minimum that will enable full conversion of the polymerisable monomers into the polyaryl sulphones; amounts larger than this offer no further advantage in speed of reaction or increase of molecular weight and may be troublesome to remove from the product. The optimum amount depends on the particular catalyst employed; ferric chloride, for example, is preferably used at not less than about 0.25 mole/100 moles of the polymerisable reagents, and antimony pentachloride is preferably used at not less than about 0.5 mole/100 moles.

The use of a small molar excess of the disulphonyl halide $X.SO_2—AR—SO_2.X$ leads to the more consistent production of products of high molecular weight, both where a mixture of $X.SO_2—Ar—SO_2.X$ and $H—Ar—H$ is used and where $H—Ar—So_2.X$ is used.

Moisture tends to have an adverse effect on the polymerisation and is preferably kept very low.

The physical properties of the products depend upon their molecular weight and the choice of starting material but with suitable choice of reagents and conditions polyaryl sulphones of high molecular weight, excellent thermal stability and high softening point may be obtained. The amorphous polymers are soluble in a number of organic solvents and are generally strong, frequently transparent, and are stable for long periods in molten form. They are therefore eminently suitable for fabrication by shaping processes for plastics such as injecting moulding, compression moulding and extrusion. They may also be cast or spun from solution to yield films and fibres.

By polymerising in the presence of a diluent, the products may be obtained in solution ready for de-ashing if desired, for example by treatment with a chelating agent for the catalyst. A further advantage of using a diluent is that the reaction between a disulphonyl halide of the formula $X.SO_2—Ar—SO_2.X$ compound of the formula $H—Ar—H$ occurs without the tendency shown in the absence of a diluent and at the higher temperatures to yield cross-linked products. The use of the disulphonyl halide is commercially advantageous because its preparation is simpler and cheaper than that of the monosulphonyl halide of the formula $H—Ar—SO_2.X$.

The following examples illustrate the invention. All viscosity measurements are reduced viscosities measured on solutions of polymer (1 g) in dimethyl formamide (100 cm$^3$) at 25°C.

EXAMPLE 1

Diphenyl ether 4-sulphonyl chloride (16.8 g) was dissolved in nitrobenzene (27.8 g). This solution (6 cm$^3$) was placed in a flask heated at 120°C and provided with a stirrer, a condenser and an inlet for passing dry nitrogen over the mixture. The solution was then stirred thoroughly at 120°C for 10 minutes under an atmosphere of nitrogen and then ferric chloride (62.5 mg; 0.385 millimole) was added as 1 cm$^3$ of a 6.25% w/v solution in nitrobenzene. After a further 4 hours, the flask was cooled and the solution diluted by the addition of dimethyl formamide (20 cm$^3$). The polymer was then precipitated by adding the solution to methanol. The solid was then filtered off, washed with methanol and dried at 150°C for 48 hours at an absolute pressure of 0.1 torr. The product was found to have a reduced viscosity of 0.42.

EXAMPLE 2

Three further polymerisation reactions were carried out and the polymers isolated as described in Example 1, except that additional nitrobenzene was added initially and the solutions were held at 120°C for a longer time after the ferric chloride was added. The amounts of additional nitrobenzene, the polymerisation times, and the reduced viscosities of the products are listed below in comparison with the product of Example 1.

| Additional nitrobenzene | Polymerisation time | Reduced viscosity |
|---|---|---|
| 0 cm$^3$ | 4 h 0 min | 0.42 |
| 4 cm$^3$ | 5 h 10 min | 0.34 |
| 8 cm$^3$ | 6 h 30 min | 0.24 |
| 12 cm$^3$ | 25 h 0 min | 0.19 |

Thus, the use of increasing amounts of diluent tends to reduce the molecular weight of the polymeric product and this reduction is not offset by increasing the reaction time.

EXAMPLE 3

Five further polymerisation reactions were carried out as described in Example 1 but at different temperatures: 80°C, 100°C, 130°C, 150°C and 180°C. The product of each was made up to a volume of 30 cm$^3$ with fresh dry nitrobenzene, cooled to room temperature, and washed four times with 5% hydrochloric acid solution. After a final wash with water, they were poured into methanol to precipitate the polymer which was filtered, washed and dried in the manner described in Example 1. A film was compression-moulded from a sample of each at 290°C using a pressure of 31.5 kg/mm$^2$ and a three-minute cycle. A visual comparison of the films showed a darkening of the colour in the sample prepared at 150°C and a marked deterioration in colour in the sample prepared at 180°C.

EXAMPLE 4

Four polymerisation flasks were set up each containing diphenyl ether (1.702 g; 10.0 millimole), diphenyl ether 4,4'-disulphonyl chloride (3.672 g; 10.0 millimole) and nitrobenzene (10 cm$^3$); the solutions were heated to 120°C and stirred under nitrogen. To each was added ferric chloride (as a solution in nitrobenzene) in the amounts shown in the table below. After 22 hours the polymerisation products were isolated by adding the solutions to methanol, filtering off the products and washing them with fresh methanol, and then drying them at 150°C for 24 hours under 0.2 torr to give the polymers whose yields and reduced viscosities are shown in the following table.

| Ferric chloride added | Polymer yield | Reduced viscosity |
|---|---|---|
| 8.1 mg (0.05 millimole) | 4.7 g | 0.18 |
| 16.2 mg (0.10 millimole) | 4.8 g | 0.17 |
| 32.4 mg (0.20 millimole) | 4.7 g | 0.07 |
| 68.4 mg (0.42 millimole) | 4.6 g | 0.22 |

EXAMPLE 5

A solution of diphenyl ether (6.808 g; 40.0 millimole) and diphenyl ether 4,4'-disulphonyl chloride (14.688 g; 40.0 millimole) in nitrobenzene (20 cm³) was heated at 130°C and maintained at this temperature for 5 minutes; then ferric chloride (64.8 mg; 0.400 millimole) was added as a 3.81 cm³ of a 1.7% w/v solution in nitrobenzene to induce polymerisation. During the whole reaction nitrogen from a cylinder of the liquid was passed continuously over the mixture. Analysis showed that it contained 1300 parts of water per million by volume. On completion of the polymerisation, the product was isolated by adding the solution to methanol, filtering off the solid, washing it with fresh methanol and drying it at 150°C under an absolute pressure of 0.2 torr for 24 hours to yield a polymer having a reduced viscosity of 0.18.

In a repeat of this process, the nitrogen supply to the reaction vessel was first passed up a 46 cm tower packed with phosphorus pentoxide on vermiculite. All connections were made with copper tubing to minimise moisture permeation through the tube walls into the nitrogen supply. Analysis of the treated nitrogen showed that it contained only 9 parts of water per million by volume. In this case, the polymeric product was found to have a reduced viscosity of 0.56.

EXAMPLE 6

Diphenyl ether (3.404 g; 20.0 millimole) was dissolved in nitrobenzene (10 cm³) with excess diphenyl ether 4,4'-disulphonyl chloride (7.413 g; 20.2 millimole) at 130°C under an atmosphere of dry nitrogen (i.e. nitrogen containing less than about 50 parts of water per million by volume). The solution was stirred for 5 minutes and then ferric chloride (32.4 mg; 0.200 millimole) was added as 1.91 cm³ of a 1.7% w/v to initiate polymerisation. After 3.5 hours, the solution was diluted with nitrobenzene (10 cm³) and stirred. Half the resultant solution was then removed and cooled, the remainder being maintained at 130°C for a total of 22 hours. After isolation and drying, the two samples of polymer obtained were found to have reduced viscosities of 0.70 and 1.9 respectively. Both were wholly soluble both in cold nitrobenzene and in cold dimethyl formamide.

By way of comparison, when diphenyl ether was similarly heated with diphenyl ether 4,4'-disulphonyl chloride in the absence of diluent, using ferric chloride (119 mg) as catalyst and a final temperature of about 235°–240°C, the separated polymeric product after washing and drying was found to be about 40% insoluble in nitrobenzene and dimethyl formamide. The soluble fraction had a reduced viscosity of 0.31.

EXAMPLE 7

1,2-diphenoxyethane (4.286 g; 20.0 millimole) and diphenyl either 4,4'-disulphonyl chloride (7.342 g; 20.0 millimole) were dissolved in nitrobenzene (10 cm³) and the solution was heated to 130°C under dry nitrogen. After 5 minutes, ferric chloride (32.4 mg; 0.200 millimole) was added as 1.80 cm³ of a 1.8% w/v solution in nitrobenzene. After 140 minutes at this temperature nitrobenzene (90 cm³) was added and the solution was cooled to room temperature. It was washed four times by stirring rigorously with 5% hydrochloric acid and then twice with distilled water, and was then added to stirred methanol to precipitate the product. Further washing with methanol and drying at 150°C for 24 hours gave a polymer (9.8 g) with a reduced viscosity of 0.71. Analysis showed it to contain 0.003% iron and 0.07% ash. The polymer was readily compression-moulded at 250°to give almost transparent films. It was amorphous on X-ray examination.

EXAMPLE 8

Dibenzofuran (3.364 g; 20.0 millimole) and diphenyl ether 4,4'-disulphonyl chloride (7.432 g; 20.0 millimole) were dissolved in nitrobenzene (10 cm³) and heated at 120°C under dry nitrogen. The solution was stirred at this temperature for 4 minutes; ferric chloride (28 mg; 0.17 millimole) was then added as 0.7 cm³ of a 4.0% w/v solution in nitrobenzene, and the reaction was continued for 22 hours at 120°C. Nitrobenzene (100 cm³) was added and the product was isolated as described in Example 7 to give an amorphous polymer (8.7 g) having a reduced viscosity of 0.48. Colourless films could be compression moulded at 310°C using a pressure of 31.5 kg/mm².

EXAMPLE 9

1,2-diphenoxyethane (2.210 g; 10.3 millimole) and diphenyl 4,4'-disulphonyl chloride (3.522 g; 10.5 millimole) were dissolved in nitrobenzene (10 cm³) and heated at 120°C under dry nitrogen. Ferric chloride (8 mg; 0.05 millimole) was added as 0.2 cm³ of a 4.0% w/v solution in nitrobenzene. After 17 hours at 120°C, the product was precipitated by adding dimethyl formamide (40 cm³) and pouring into stirred methanol. On washing and drying amorphous polymer (5.1 g) was obtained having a reduced viscosity of 0.21.

EXAMPLE 10

Diphenyl 4,4'-disulphonyl chloride (3.522 g; 10.5 millimole) and dibenzofuran (1.682 g; 10.0 millimole) were dissolved in nitrobenzene (10 cm³) and heated at 120°C under dry nitrogen. Ferric chloride (8 mg; 0.05 millimole) was added as 0.2 cm³ of a 4.0% w/v solution in nitrobenzene. Three minutes after addition of the catalyst polymer began to precipitate from solution. After 16 hours at 120°C the mixture was diluted with dimethyl formamide and filtered. The precipitate was washed well with methanol and dried. The polymer (3.1 g) was found to be crystalline on X-ray examination and insoluble in all common solvents.

EXAMPLE 11

Diphenyl ether (17.02 g; 100 millimole) and diphenyl ether 4,4'-disulphonyl chloride (37.065 g; 101 millimole) were dissolved in nitrobenzene (50 cm³) at 130°C under an atmosphere of dry nitrogen and ferric chloride (97 mg; 0.60 millimole) was added as a solution in 5 g of nitrobenzene. After 3.5 hours, a sample was removed from the reaction vessel and diluted with further nitrobenzene and the product was precipitated by pouring into methanol. After drying, this polymer was found to have a reduced viscosity of 0.70. The remainder of the reaction mixture was allowed to polymerise for a total of 6.75 hours to yield a final product which, after separation, washing and drying, has a reduced viscosity of 1.18.

EXAMPLE 12

Diphenyl ether (34.04 g; 200 millimole) and diphenyl ether 4,4'-disulphonyl chloride (74.13 g; 202 millimole) were dissolved in nitrobenzene (100 cm³) at 130°C under an atmosphere of dry nitrogen. After 6 minutes, ferric chloride (304 mg; 1.87 millimole) was added as a solution in 18 g of nitrobenzene, and the mixture was allowed to polymerise for 5.5 hours. The viscous product was cooled, diluted with nitrobenzene (800 cm³) and then stirred vigorously with 5N hydrochloric acid solution (100 cm³). After separation of the aqueous layer, the washing with hydrochloric acid was repeated four times and the final wash was followed by a wash with 5% sodium carbonate solution and four washes with water. The polymer was then precipitated by pouring the nitrobenzene solution into methanol. It was filtered off, extracted with methanol for 24 hours, and dried at 170°C for 48 hours under an absolute pressure of 0.2 torr to give a polymer (87 g) having a reduced viscosity of 0.70. A film 0.127 mm thick was compression-moulded from a sample of the polymer at 300°C and a pressure of 31.5 kg/mm² and was found to have a yield point under tensil stress of 10.05 kg/mm² at 20°C.

EXAMPLE 13

Diphenyl ether (17.02 g; 100 millimole) and diphenyl 4,4'-disulphonyl chloride (35.40 g; 106 millimole) were dissolved in nitrobenzene (50 cm³) and heated with stirring at a 140°C under dry nitrogen. Ferric chloride (137 mg; 0.84 millimole) was injected as 8.10 cm³ of a 1.69% w/v solution in nitrobenzene using a hypodermic syringe. The polymerisation was terminated after 6 hours by adding molten diphenyl ether (1 cm³), and the mixture was stirred for a further 17 hours at 140°C. It was then poured into methanol in a macerator; and the solid was filtered off, suspended in fresh methanol, and heated under reflux for 24 hours. The product was filtered off and dried at 100°C in vacuum for 17 hours to give a polymer (44.9 g) having a reduced viscosity of 0.55.

The polymer was compression-moulded into blocks 5.08 × 2.54 × 1.27 cm³ and into film 0.18 mm thick at 280°C, 300°C, 320°C, 340°C and 360°C. The materials became progressively deeper in colour as the temperature was increased. The films obtained at 280°C and 300°C showed evidence of internal strain, and that moulded at 360°C showed some evidence of decomposition.

EXAMPLE 14

Diphenyl ether 4-sulphonyl chloride (107.48 g; 400 millimole) was dissolved in nitrobenzene (100 cm³) and the solution was allowed to equilibrate at 120°C. Antimony pentachloride (0.39 cm³; 3.05 millimole) was added as 30 cm³ of a 1.3% v/v solution in nitrobenzene and the mixture was stirred for 4 hours at 120°C. Aniline (5cm³) in nitrobenzene (100 cm³) was added to terminate the reaction and the mixture was stirred at 120°C for another hour. The solution was added to methanol in a macerator, and the precipitated product was washed twice with hot methanol and then with acetone, and dried at 190°C for 24 hours at 0.1 torr to yield a polymer (89 g) having a reduced viscosity of 0.72. It was compression-moulded at 240°C into specimens 7.62 × 5.08 × 0.32 cm³.

NOTE

The table below shows the amounts of nitrobenzene in parts by weight per part by weight of polymerisable reagent (monomer) that were used in the polymerisation mixtures of the foregoing examples, after taking account of the additional nitrobenzene introduced with the catalyst. It also shows the amount of catalyst employed in moles per 100 moles of the polymerisable reagents, the catalyst being antimony pentachloride in Example 14 and ferric chloride in the other examples.

| Example | Parts of nitrobenzene per part of monomer | Moles of catalyst per 100 moles of monomer |
|---|---|---|
| 1 | 2.1 | 2.9 |
| 2 | 3.1  4.3, 5.4 | 2.9 |
| 3 | 2.1 | 2.9 |
| 4 | 2.2 | 0.25, 0.50, 1.00, 2.11 |
| 5 | 1.33 | 0.50 |
| 6 | 1.32 | 0.50 |
| 7 | 1.22 | 0.50 |
| 8 | 1.19 | 0.43 |
| 9 | 2.13 | 0.24 |
| 10 | 2.35 | 0.24 |
| 11 | 1.20 | 0.30 |
| 12 | 1.28 | 0.47 |
| 13 | 1.33 | 0.41 |
| 14 | 1.45 | 0.76 |

I claim:

1. In a process for the manufacture of polyaryl sulphones containing repeating units of the formula —Ar—SO₂— from a starting material selected from the class consisting of reagents of the formula H—Ar—SO₂.X and mixtures of reagents of the formulae X.SO₂—AR—SO₂.X and H—Ar—H, in which formulae X is a halogen atom and Ar is a bivalent aromatic radical, the modification wherein the polymerisation is carried out at a temperature not exceeding 160°C in solution in a diluent selected from the class consisting of nitrobenzenes of the formula

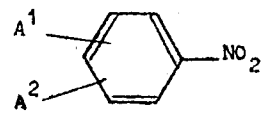

in which A¹ is selected from the class consisting of hydrogen and halogen atoms and alkyl, cyano and nitro groups and A² is selected from the class consisting of hydrogen and halogen atoms and alkyl groups, the alkyl groups having not more than 4 carbon atoms each, using as catalyst a Lewis acid capable of generating a sulphonylium cationic species —(Ar—SO₂)⁺ from an aromatic sulphonyl halide —(Ar—SO₂.X) dissolved in a nitrobenzene of the above formula.

2. A process according to claim 1, characterised in that 0.75 to 3 parts by weight of the nitrobenzene are used per part by weight of the polymerisable reagents.

3. A process according to claim 1, characterised in that the solvent is nitrobenzene.

4. A process according to claim 1, characterised in that the polymerisation is carried out at 100°–140°C.

5. A process according to claim 1, characterised in that a small molar excess of the reagent of formula X.SO₂—Ar—SO₂.X is used.

6. A process according to claim 1, characterised in that the catalyst is antimony pentachloride employed at not less than 0.5 mole per 100 moles of the polymerisable reagents and not more than 5 by weight of the polymerisable reagents.

7. A process according to claim 1, characterised in that the catalyst is ferric chloride employed at not less than 0.25 mole per 100 moles of the polymerisable reagents and not more than 5 by weight of the polymerisable reagents.

8. A process according to claim 1, wherein the bivalent aromatic radical Ar in the polymerisable reagents is selected from the class consisting of those derived from benzene, polynuclear hydrocarbons containing not more than two aromatic rings, and compounds of the formula

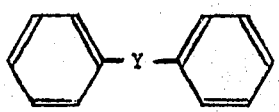

(in which Y is selected from the class consisting of direct links, —O—, —S—, —SO—, —SO$_2$—, —CO—, divalent hydrocarbon radicals, and residues of diols, each benzene ring bearing one of the two valencies of the radical Ar) and ring-substituted derivatives thereof, and Ar may vary from unit to unit in the chain of the polymer produced.

9. A process according to claim 8, wherein the polymerisable reagents contain units of the formula

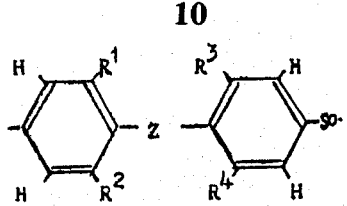

in which R$^1$, R$^2$, R$^3$ and R$^4$ are selected from the class consisting of hydrogen and halogen atoms and alkyl and alkoxy groups having from 1 to 4 carbon atoms, and Z is selected from the class consisting of —O— and —S— and may also be a direct link in some of the units.

10. A process according to claim 1 wherein the solvent is nitrobenzene and the polymerisation temperature does not exceed 140°C.

* * * * *

UNITED STATES PATENT OFFICE
CERTIFICATE OF CORRECTION

Patent No. 3,951,918    Dated April 20, 1976

Inventor(s) Michael Edward Benet Jones

It is certified that error appears in the above-identified patent and that said Letters Patent are hereby corrected as shown below:

In item [30],

The priority data should be corrected to read:

--Nov. 6, 1962    United Kingdom.....41976/62
  Mar. 18, 1963   United Kingdom.....10592/63
  Aug. 6, 1964    United Kingdom.....32016/64  --

Column 1, line 58:  "dioxothiclan" should be --dioxothiolan--

Column 2, line 57:  "halaide" should be --halide--

Column 2, line 61:  "Iv" should be --IV--

Column 3, line 16:  "H-Ar-So$_2$.X" should be --H-Ar-SO$_2$.X--

Column 5, line 54:  "either" should be --ether--

Column 6, line 1:   "250°" should be --250°C--

Column 7, line 15:  "tensil" should be --tensile--

Column 8, in the table, second row of figures:   a comma --,-- should be inserted after "3.1"

Signed and Sealed this

Thirty-first Day of August 1976

[SEAL]

Attest:

RUTH C. MASON
Attesting Officer

C. MARSHALL DANN
Commissioner of Patents and Trademarks